United States Patent [19]
Kumazawa et al.

[11] Patent Number: 5,466,939
[45] Date of Patent: Nov. 14, 1995

[54] NUCLEAR MEDICINE IMAGING APPARATUS

[75] Inventors: Yoshihiko Kumazawa, Kameoka; Kazumi Tanaka, Otsu, both of Japan

[73] Assignee: Shimadzu Corporation, Kyoto, Japan

[21] Appl. No.: 124,860

[22] Filed: Sep. 22, 1993

[30] Foreign Application Priority Data

Sep. 24, 1992 [JP] Japan .................................. 4-280475
Mar. 31, 1993 [JP] Japan .................................. 5-098632

[51] Int. Cl.$^6$ .................................................. G01T 1/166
[52] U.S. Cl. ............................... 250/363.04; 250/363.09; 250/363.07
[58] Field of Search ........................ 364/413.13, 413.24; 250/362.02, 363.04, 363.07, 363.09, 370.1; 378/7, 901

[56] References Cited

U.S. PATENT DOCUMENTS

| | | | |
|---|---|---|---|
| 4,780,823 | 10/1988 | Stoub et al. | 364/413.13 |
| 4,839,808 | 6/1989 | Koral et al. | 364/413.24 |
| 4,873,632 | 10/1989 | Logan et al. | 364/413.13 |
| 5,227,968 | 7/1993 | Ichihara | 364/413.24 |
| 5,293,195 | 3/1994 | Berlad et al. | 364/413.24 |

FOREIGN PATENT DOCUMENTS 62-167491  7/1987  Japan.

Primary Examiner—David P. Porta
Assistant Examiner—David Vernon Bruce
Attorney, Agent, or Firm—Nikaido, Marmelstein, Murray & Oram

[57] ABSTRACT

A first image collection memory collects two-dimensional image data within a predetermined energy window to constitute a fine matrix. A second image collection memory collects three-dimensional image data, including energy spectral information, to constitute a coarse matrix. Each pixel of the data collected in the second image collection memory is subjected to a scatter correction with energy weighted acquisition using a weight function. Correction coefficients are derived from a ratio between data before the correction and data after the correction, and by interpolation processing for each pixel in the fine matrix, and are applied to the image data collected in the first image collection memory. The data collected in the second image collection memory is subjected to two-dimensional low-pass filter processing. The scatter correction with the energy weighted acquisition is effected for each data collected in the second image collection memory such that the function is applied to the data before the filter processing, or after the filter processing.

16 Claims, 11 Drawing Sheets

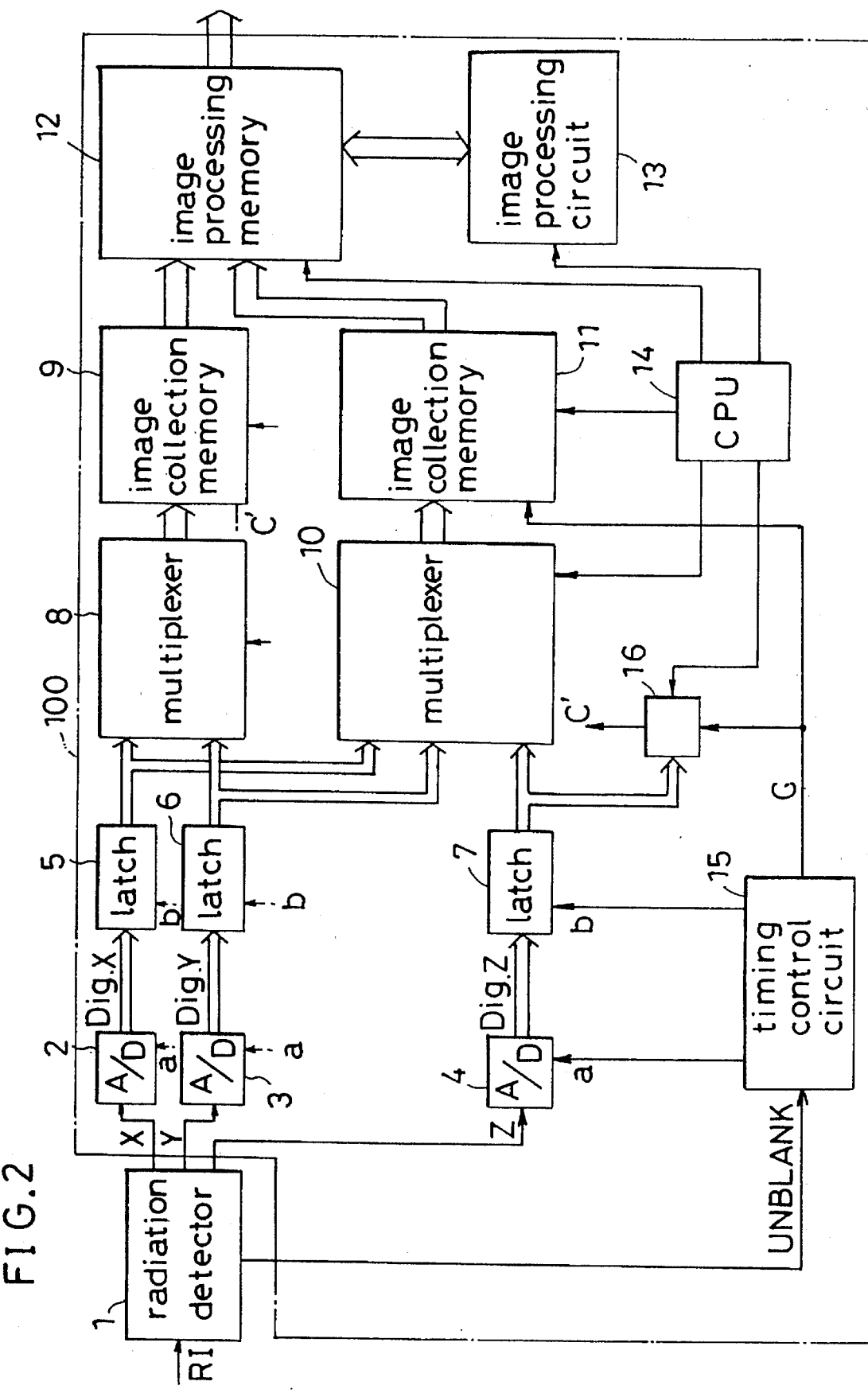

NUCLEAR MEDICINE IMAGING APPARATUS

BACKGROUND OF THE INVENTION (1) Field of the Invention

This invention relates to imaging apparatus for use in nuclear medicine, and more particularly to an improvement in scintillation cameras used in static radiography with a fixed detector and in SPECT (Single Photon Emission Computerized Tomography) with a revolving detector.

(2) Description of the Related Art

A nuclear medicine imaging apparatus detects, outside the body examined, the radiation released by radioactive substances introduced into the body. Prior to release of the radiation outside the body, Compton scatter and absorption take place owing to body tissues. It is necessary to effect a correction to these phenomena. Conventional techniques of such correction are disclosed in U.S. Pat. No. 4,780,823 and Japanese Patent Publication (Unexamined) No. 62-167491, for example.

However, these conventional techniques have the disadvantages of being unsatisfactory in quantification and involving enormous amounts of computation processing. In U.S. Pat. No. 4,780,823, a fixed energy weight function is approximated regardless of locations in order to correct scatter in real time. This results in poor quantification. In Japanese Patent Publication (Unexamined) No. 62-167491, scatter correcting coefficients and energy weight functions are varied for individual locations (pixels) based on energy spectral information. Although quantification is good, this technique is not practical in that a matrix on the order of 64×64 as in SPECT is its limit, and that statistical errors would occur and enormous amounts of computation processing would be involved for a matrix of 512×512 as in static radiography.

Furthermore, while only data of small counts are available from ordinary clinical procedures, the conventional techniques put the obtained raw data per se to correction processing. As a consequence, considerable statistical errors tend to occur, which in turn produce even greater computational errors. Resultant images have a great deal of noise in background regions and cold spots.

SUMMARY OF THE INVENTION

This invention has been made with regard to the state of the art noted above, and its object is to provide an improved nuclear medicine imaging apparatus capable of correcting scattered radiation, with reduced amounts of computational processing and minimal statistical errors regardless of matrix size, and yet with excellent quantification.

Another object of this invention is to provide an improved nuclear medicine imaging apparatus capable of correcting scattered radiation, which suppresses noise in background regions and cold spots even with data of small counts such as clinical data, thereby to diminish influences of scattered radiation, increase contrast of the cold spots, and enhance spatial resolution of images.

To fulfill the above objects, this invention provides the following apparatus.

In a first aspect of the invention, a nuclear medicine imaging apparatus having a scatter correcting device for processing radiation detected after being released by radioactive substances introduced into a body examined, comprises:

a radiation detecting device for generating two-dimensional position signals indicating positions of incident radiation, and an energy signal indicating energy level of said radiation;

a first image data collecting and storing device for collecting two-dimensional image data at addresses provided by digital values of the two-dimensional position signals, respectively;

a second image data collecting and storing device for collecting three-dimensional image data at addresses provided by upper bits of the digital values of the two-dimensional position signals and by digital values of the energy signal;

a pulse amplitude analyzing device for analyzing the energy signal to allow the first image data collecting and storing device to carry out data correction when said energy signal has a pulse height falling within a predetermined window: and an image processing device for effecting a scatter correction with energy weighted acquisition for the data collected in the second image data collecting and storing device, obtaining a first correction coefficient for each pixel in the second image data collecting and storing device by computing, for each pixel, a ratio between data resulting from the correction and data within the window of the data collected in the second image data collecting and storing device prior to the correction, obtaining a second correction coefficient for each pixel in the first image data collecting and storing device by interpolating the first correction coefficient, and applying the second correction coefficient to the data collected in the first image data collecting and storing device, thereby to correct the image data collected in the first image data collecting and storing device.

According to this apparatus, the second image data collecting and storing device can collect three-dimensional image data at three-dimensional addresses designated by the two-dimensional position signals and energy signal. However, these two-dimensional position signals are coarse signals. Energy spectral information obtained for each pixel is therefore relatively free from statistical errors. Based on this information, a scatter correction with the energy weighted acquisition is effected for each pixel. A correction coefficient is then obtained by computing a ratio between corrected data and uncorrected data, the latter being the data within the energy window among those data collected in the second image data collecting and storing device. In this way, a correction coefficient is obtained for each pixel in the coarse matrix stored in the second image data collecting and storing device. This correction coefficient is interpolated to provide the second correction coefficient for each pixel in the fine matrix stored in the first image data collecting and storing device. The second correction coefficient is applicable to the data in the energy window collected in the first image data collecting and storing device. Thus, the second correction coefficient is applied to effect a scatter correction of the image data collected in the first image data collecting and storing device. The scatter correction with the energy weighted acquisition is done for the coarse matrix, thereby diminishing amounts of computation. Moreover, the computation is simple since a ratio between corrected data and uncorrected data is computed, the ratio is interpolated to obtain a correction coefficient for the fine matrix, and this correction coefficient is applied to the image data in the first image data collecting and storing device. In addition, quantification is improved by varying the energy weighting function for each position or pixel based on energy spectral information to effect the scatter correction with the energy weighted acquisition. The scatter correction with the energy weighted acquisition may be carried out with diminished amounts of computation and diminished statistical errors, not only in SPECT radiography but in static radiography (to visualize images having a matrix size 512×512) and whole body scan radiography (to visualize images having a matrix size 256×1024 or 512×2048). This apparatus carries out the scatter correction after collecting image data for all pixels and all energy spectra (i.e. as after-processing). Consequently, both corrected data and uncorrected data are made available. The correction may readily be made by varying correction parameters to compare results.

In a second aspect of the invention, a nuclear medicine imaging apparatus having a scatter correcting device for processing radiation detected after being released by radioactive substances introduced into a body examined, comprises:

a radiation detecting device for generating two-dimensional position signals indicating positions of incident radiation, and an energy signal indicating energy level of said radiation;

an image data collecting and storing device for collecting three-dimensional image data at addresses provided by digital values of the two-dimensional position signals and the energy signal;

a filter device for effecting two-dimensional low-pass filter processing for the three-dimensional image data collected; and a data correcting device for effecting a scatter correction with energy weighted acquisition for each pixel by using an energy weighting function stored in advance, such that, for an energy range having a value of the function over or equal to a predetermined value, the function is applied to data not processed by the filter device, and for an energy range having a value of the function below the predetermined value, the function is applied to data processed with the filter by the filter device.

According to the apparatus in the second aspect of the invention, the energy weighting function is compared with a predetermined value. The scatter correction with the energy weighted acquisition is effected for each pixel such that, for an energy range having a weighting function equal to or above the predetermined value, the function is applied to the data before the filter processing, and for an energy range having a function below the predetermined value, the function is applied to the data after the filter processing. Thus, by using the data after the filter processing for data having a small count, it is possible to prevent computational errors due to statistical errors resulting from the small count. As a result, errors in regions of scattered radiation may be diminished. A region of scattered radiation essentially has data of low spatial resolution, and no harm is done by use of filtered data. In the case of small counts as in clinical data, noise in background regions and cold spots may be suppressed to diminish influences of scattered radiation, increase contrast of the cold spots, and enhance spatial resolution of images. Quantification in particular may be improved by a scatter correction using energy weighting functions varied for individual positions or pixels according to their energy spectral information. This is applicable not only to SPECT radiography but to static radiography and whole body scan radiography. Both the images before the correction and the images after the correction may be made available.

In a third aspect of the invention, the apparatus in the first aspect further comprises a filter device for effecting two-dimensional low-pass filter processing for the three-dimensional image data collected in the second image data collecting and storing device, wherein the image processing device is operable to effect the scatter correction with energy weighted acquisition for each data collected in the second image data collecting and storing device, by using an energy weighting function stored in advance, such that, for an energy range having a value of the function over or equal to a predetermined value, the function is applied to data before the filter processing by the filter device, and for an energy range having a value of the function below the predetermined value, the function is applied to data after the filter processing by the filter device.

The apparatus in the third aspect of the invention is capable of a scatter correction with reduced amounts of computation and statistical errors regardless of matrix size, and with excellent quantification, as is the apparatus in the first aspect. In addition, this apparatus produces the same effects as the apparatus in the second aspect, i.e. suppressing noise in background regions and cold spots in the case of small counts as in clinical data, to diminish influences of scattered radiation, increase contrast of the cold spots, and enhance spatial resolution of images.

BRIEF DESCRIPTION OF THE DRAWINGS

For the purpose of illustrating the invention, there are shown in the drawings several forms which are presently preferred, it being understood, however, that the invention is not limited to the precise arrangements and instrumentalities shown.

FIG. 2 is a block diagram of a scatter correcting device in a first embodiment of this invention;

DETAILED DESCRIPTION OF THE PREFERRED EMBODIMENTS

Preferred embodiments of this invention will be described in detail hereinafter with reference to the drawings.

First Embodiment

A nuclear medicine imaging apparatus in a first embodiment of this invention will be described with reference to FIGS. 1 and 2. The apparatus in the first embodiment corresponds to the invention recited in claim 1.

Figure 1:
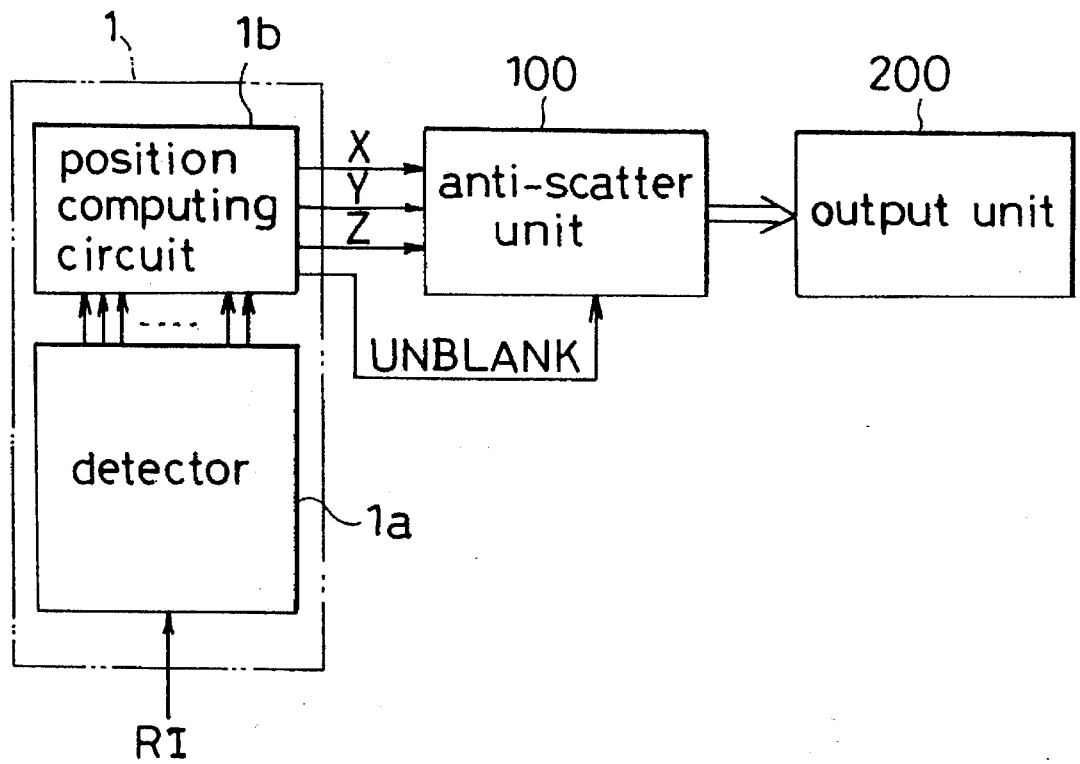
FIG. 1 is a block diagram of a nuclear medicine image apparatus according to this invention.

As shown in FIG. 1, a nuclear medicine imaging apparatus according to this invention includes a detector 1a such as a scintillator or PMT (photomultiplier tube) for detecting radiation RI released by radioactive substances introduced into the body of an examinee not shown. A position computing circuit 1b derives two-dimensional position signals (X, Y) and an energy signal (Z) from detection results, and outputs these signals. The detector 1a and position computing circuit 1b constitute a radiation detector 1 discussed in this and subsequent embodiments. The signals X, Y and Z outputted from the radiation detector 1 are transmitted to a scatter correcting device 100 for collecting image data of individual locations and effecting a scatter correction of the image data collected. The radiation detector 1 also applies an unblank signal to the scatter correcting device 100 to notify radiation incidence timing. The scatter correcting device 100 applies processed image data (corrected data and collected but not corrected data) are applied to an output device 200. The output device 200 is in the form of a monitor, a multiformat camera for recording the images on film, or the like, to output RI distribution images of a body interior to a predetermined output medium.

Details of the scatter correcting device 100 forming a principal portion of the first embodiment will be described next with reference to FIG. 2. As shown in FIG. 2, the two-dimensional position signals X and Y representing locations of radiation incidence and the energy signal Z are outputted from the radiation detector 1 acting as the radiation detecting means to A/D (analog-to-digital) converters 2, 3 and 4 where these signals are converted to digital signals Dig.X, Dig.Y and Dig.Z, respectively. These digital signals are transmitted through latch circuits 5, 6 and 7 to multiplexers 8 and 10.

The multiplexer 8 switches and selects the signals Dig.X and Dig.Y as address signals, and transmits them to an image collection memory 9 corresponding to the first image data collecting and storing means. The multiplexer 10 receives upper bits of the respective signals Dig.X and Dig.Y and full bits of signal Dig. Z. The multiplexer 10 switches and selects these bits as address signals, and transmits them to an image collection memory 11 corresponding to the second image data collecting and storing means. The signal Dig.Z is transmitted also to a main pulse amplitude analyzer 16 acting as the pulse amplitude analyzing means.

The radiation detector 1 includes a preliminary pulse amplitude analyzer (not shown). The unblank signal is produced through discrimination by this pulse amplitude analyzer, and transmitted to a timing control circuit 15 to trigger the latter. With each triggering, i.e. each event of radiation incidence, the timing control circuit 15 generates appropriate timing signals "a", "b" and "c", and transmits these signals to the A/D converters 2, 3 and 4, latch circuits 5, 6 and 7, image collection memory 11 and main pulse amplitude analyzer 16.

The main pulse amplitude analyzer 16 analyzes and determines whether the digital energy signal Dig.Z is within, for example, a 20% window of photoelectric peaks. The analyzer 16 generates a signal c' when the signal Dig.Z is within the window, and transmits the signal c' to the image collection memory 9.

Figure 3:
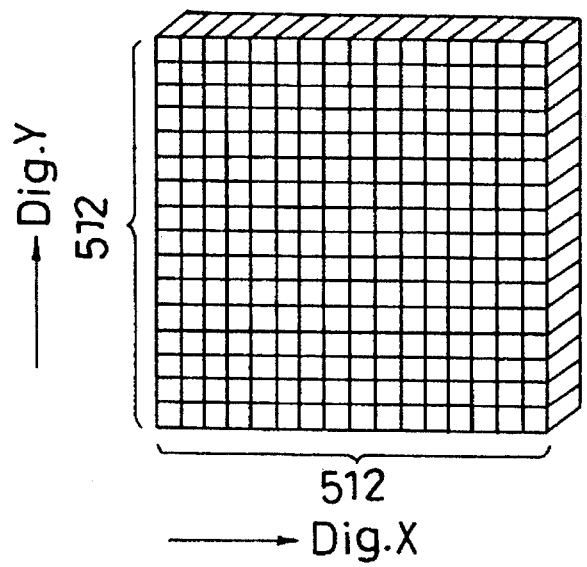
FIG. 3 is a conceptual view of a first image collection memory.

Upon receipt of the signal c', the image collection memory 9 adds +1 to a current address designated by the signals Dig.X and Dig.Y from the multiplexer 8. In this way, the image collection memory 9 collects two-dimensional image data in the form of a 512×512 matrix as shown in FIG. 3, for example, for events where the energy is within 20% of photoelectric peaks.

Figure 4:
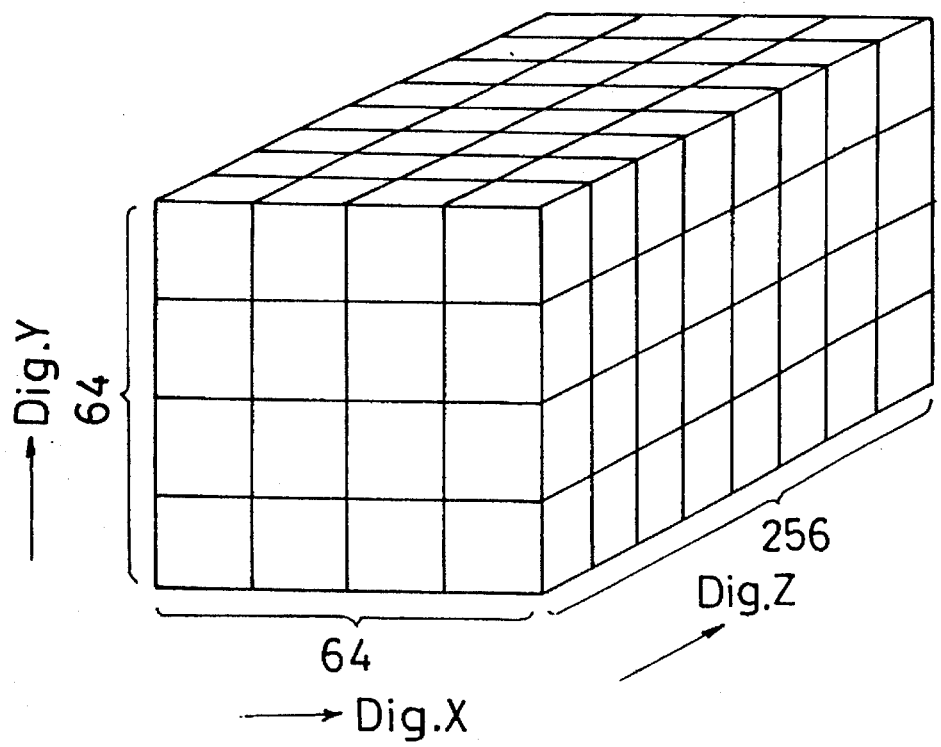
FIG. 4 is a conceptual view of a second image collection memory.
Figure 5A:
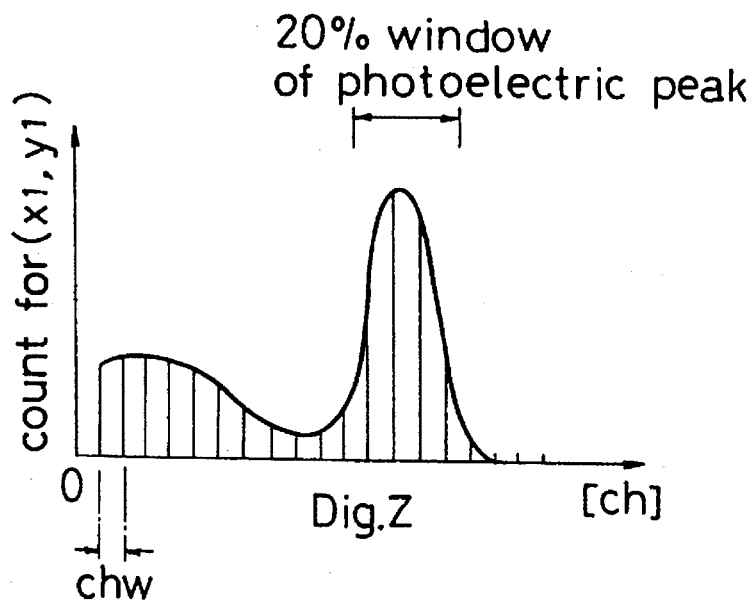
FIGS. 5A and 5B are views showing examples of energy spectra.
Figure 5B:
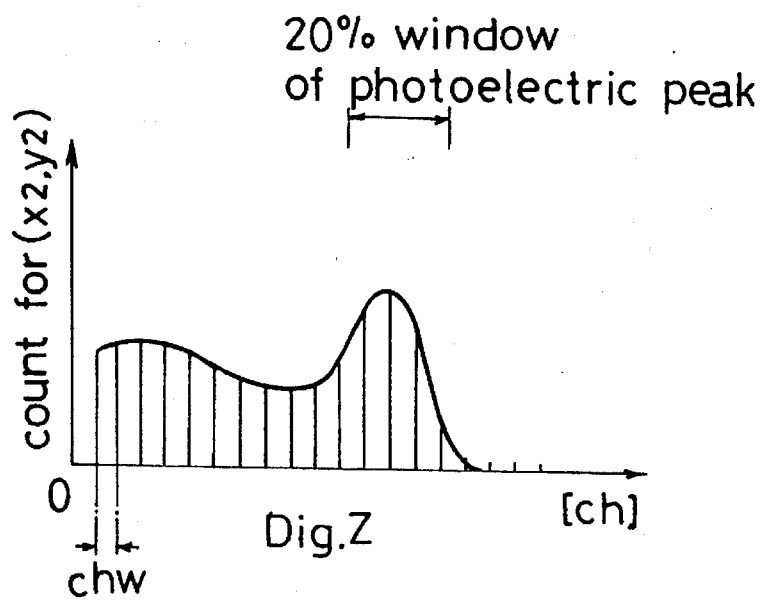

On the other hand, the image collection memory 11 collects three-dimensional data for all energy ranges. Specifically, for each event, +1 is added to each of three-dimensional address spaces designated by the upper bits of the signals Dig.X and Dig.Y inputted as address signals, and designated by the signal Dig.Z. It is to be noted here that +1 is added for all the events having generated the unblank signal and, since the preliminary pulse amplitude analyzer in the radiation detector 1 has a window significantly wider than the window (e.g. 20%) set to the main pulse amplitude analyzer 16, data is collected for each energy level over an extensive energy range. Consequently, as shown in FIG. 4, for example, the image collection memory 11 collects data for the number of events corresponding to 64×64 pixels in 256 energy levels. For pixel (x1, y1), an energy spectrum as shown in FIG. 5A is collected, for example. For pixel (x2, y2), an energy spectrum as shown in FIG. 5B is collected. These energy spectra show that pixel (x2, y2) has more scattered radiation, i.e. a thicker scatter volume, than pixel (x1, y1).

The data collected in the memories 9 and 11 are transferred to an image processing memory 12. The image processing memory 12 and an image processing circuit 13 effect image processing (after-processing) such as a scatter correction with the energy weighted acquisition. The multiplexers 8 and 10, image collection memories 9 and 11, image processing memory 12, image processing circuit 13 and main pulse amplitude analyzer 16 are controlled by a CPU (central processing unit) 14. The image processing memory 12 and image processing circuit 13 correspond to the image processing means in claim 1.

Figure 6A:
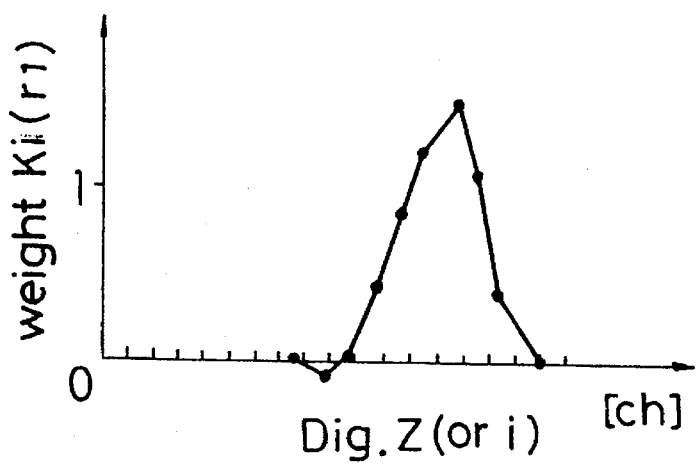
FIGS. 6A and 6B are views showing examples of weight functions.
Figure 6B:
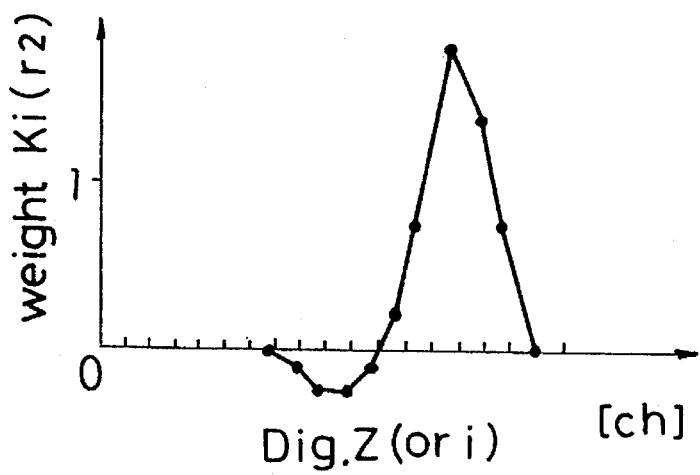

The scatter correction with the energy weighted acquisition is carried out as follows. In this example, a scatter correction with simple energy weighted acquisition is carried out. The scatter correction is carried out for each unit of 64×64 pixels collected in the image collection memory 11, using the following equation:

$$Cc(x, y) = \sum_{i=1}^{max} \{Ki(r) \cdot Ci(x, y)\} \quad (1)$$

where Cc(x, y) is a count for pixel (x, y) after the correction, Ci(x, y) is a count of energy Dig.Z= i[ch] (ch: channels) for pixel (x, y), and Ki(r) is a weight for energy Dig.Z=i[ch]. Weight Ki(r) is a function of parameter "r" (e.g. a count ratio between photoelectric peak region and Compton scatter region) derived from energy spectral information of each pixel (x, y). Function Ki(r) itself is derived beforehand from a phantom or the like, and stored in the image processing circuit 13, for example. Then, parameter "r" is derived from actual energy spectral information of each pixel, and is substituted to obtain a weight. This computation is carried out by the image processing circuit 13 and CPU 14. FIGS. 6A and 6B show examples of weighting functions. FIG. 6A shows weight Ki(r1) for pixel (x1, y1) having the energy spectrum shown in FIG. 5A. FIG. 6B shows weight Ki(r2) for pixel (x2, y2) having the energy spectrum shown in FIG. 5B. These weights are different because of different parameters r1 and r2 of the energy spectral information.

Where parameter "r" is the same, the weight will be the same for different pixels.

Next, a count $C_0(x, y)$ of 20% windows to be excluded from the scatter correction is derived for each pixel from the data collected in the image collection memory 11, using the following equation:

$$C_0(x, y) = \sum_{i=l}^{h} \{Ci(x, y)\} \qquad (2)$$

(1<l<h<max)
where
 l: −10% of photoelectric peaks; and
 h: +10% of photoelectric peaks.

Then, a correction coefficient $p(x, y)$ is derived from a ratio between count Cc after the correction and count $C_0$ of 20% windows for non-correction, as follows:

$$p(x, y) = Cc(x, y)/C_0(x, y) \qquad (3)$$

Such correction coefficients are obtained only for 64×64 pixels. Correction coefficients for 512×512 pixels are obtained by two-dimensional interpolation.

Figure 7:
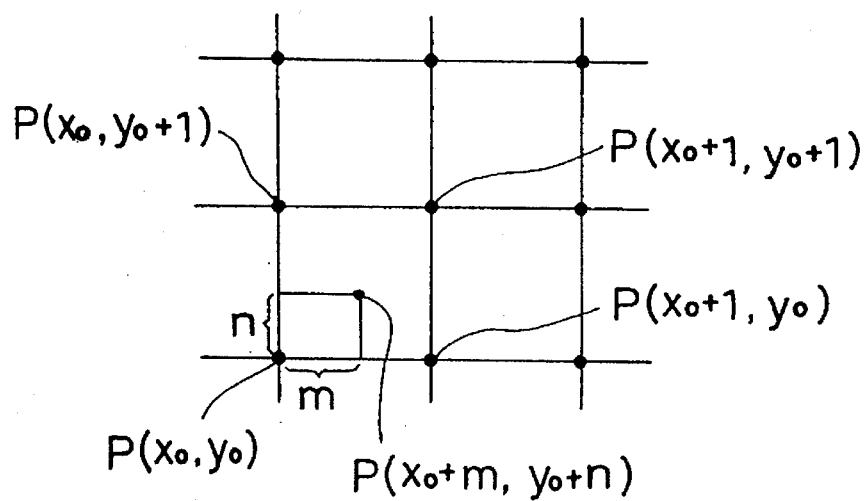
FIG. 7 is an explanatory view of an interpolating computation.

The two-dimensional interpolation is done, for example, by using correction coefficients for surrounding four points as shown in FIG. 7. That is, a correction coefficient $p(x_0+m, y_0+n)$ for a point $(x_0+m, y_0+n)$ is derived from the following equation:

$$p(x_0+m, y_0+n) = q_0 + q_1 \cdot m + q_2 \cdot n + q_3 \cdot m \cdot n \qquad (4)$$

where
 $q_0 = p(x_0, y_0)$,
 $q_1 = p(x_0+1, y_0) - p(x_0, y_0)$,
 $q_2 = p(x_0, y_0+1) - p(x_0, y_0)$, and
 $q_3 = p(x_0+1, y_0+1) - p(x_0+1, y_0) - p(x_0, y_0+1) + p(x_0, y_0)$.

Methods of interpolation other than the above may be used to obtain correction coefficients for the 512×512 pixels based on the correction coefficients for the 64×64 pixels.

After the correction coefficients for the 512×512 pixels are obtained, the image data of the 512×512 pixels collected in the image collection memory 9 are multiplied by these correction coefficients. For example a count $Dc(x_0+m, y_0+n)$ for a pixel $(x_0+m, y_0+n)$ after the correction is derived from the following equation, where $D_0(x_0+m, y_0+n)$ is a count of 20% windows for this pixel $(x_0+m, y_0+n)$ before the correction:

$$Dc(x_0+m, y_0+n) = p(x_0+m, y_0+n) \cdot D_0(x_0+m, y_0+n) \qquad (5)$$

The above embodiment is not limitative but may be modified in various ways without departing from the purport of claim 1. For example, matrix sizes other than those described above may be employed.

It is also possible to carry out a scatter correction with the area weighted acquisition (i.e. a correction using a two-dimensional space filter) in place of the scatter correction with the simple energy weighted acquisition.

The described scatter correction with the energy weighted acquisition is effected by using a weight function for each pixel based on its energy spectrum. Even where a fixed weight function not dependent on the pixel or its energy spectrum is used, the scatter correction produces the effects of diminishing at least amounts of computational processing and statistical errors.

Figure 8A:
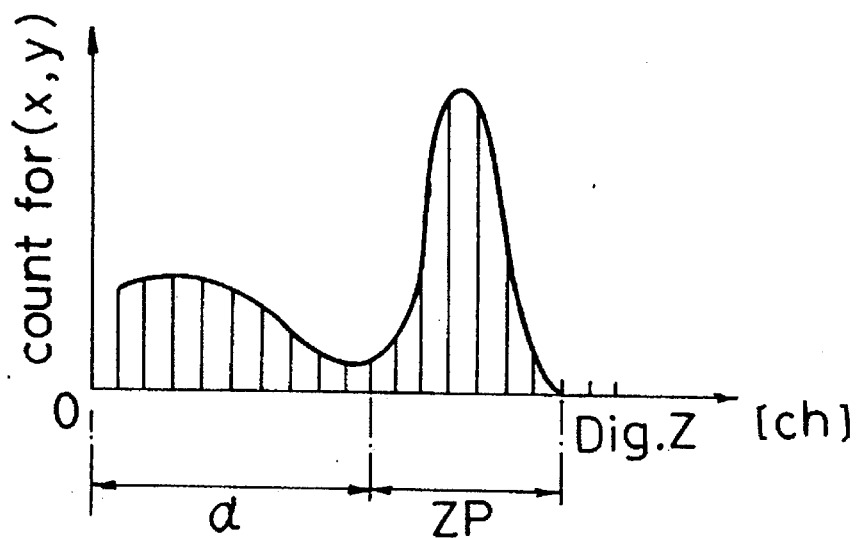
FIGS. 8A and 8B are explanatory views of a necessity to convert channel widths.

In the foregoing embodiment, the image collection memory 11 corrects image data for individual pixels in uniform channel widths ("chW" in FIGS. 5A and 5B) of energy signal Dig.Z. However, with an energy spectrum as shown in FIG. 8A, for example, there is a desire for a more detailed detection of an energy spectrum adjacent a photoelectric peak ZP (see FIG. 8B). To cope with such a situation, the foregoing embodiment may include a circuit for converting the channel widths of the energy signal in which the image collection memory 11 collects image data.

Figure 9:
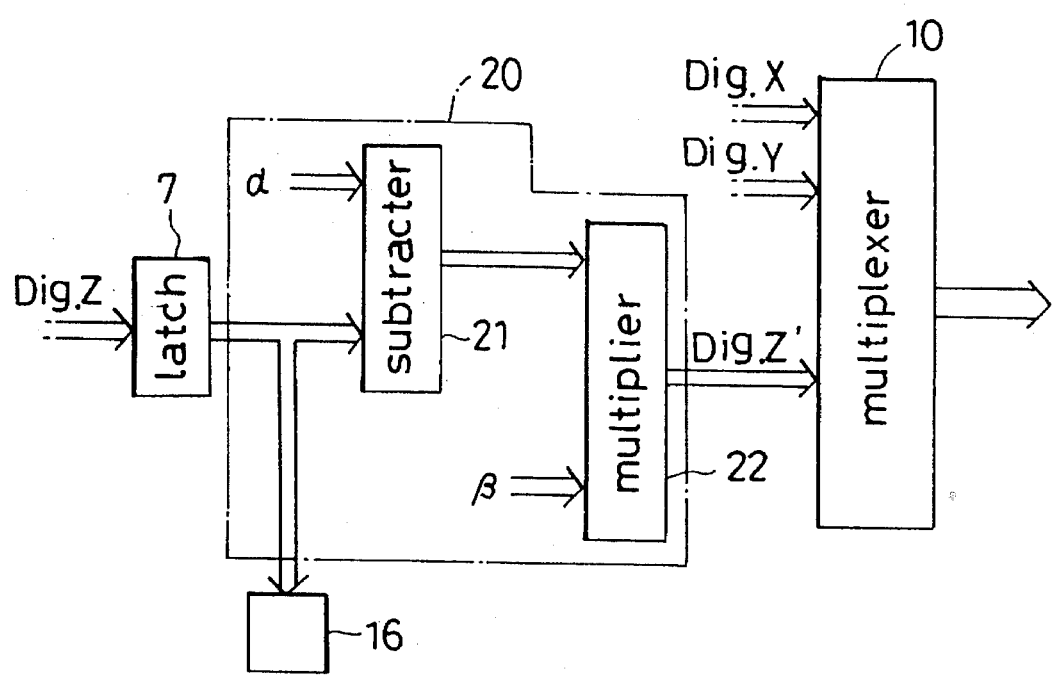
FIG. 9 is a block diagram of a channel width converter.

Specifically, as shown in FIG. 9, digital value Dig.Z of the energy signal outputted from the latch circuit 7 is inputted to a subtracter 21, where offset value α (see FIG. 8A) is subtracted from the value Dig.Z. The resultant difference is inputted to a multiplier 22 to multiply the difference by gain β which is a conversion factor. The result is inputted to the multiplexer 10. Consequently, the multiplexer 10 receives result Dig.Z' of conversion from the digital value Dig.Z of the energy signal outputted from the latch circuit 7, as expressed by the following equation:

$$Dig.Z' = \beta(Dig.Z - \alpha) \qquad (6)$$

Figure 8B:
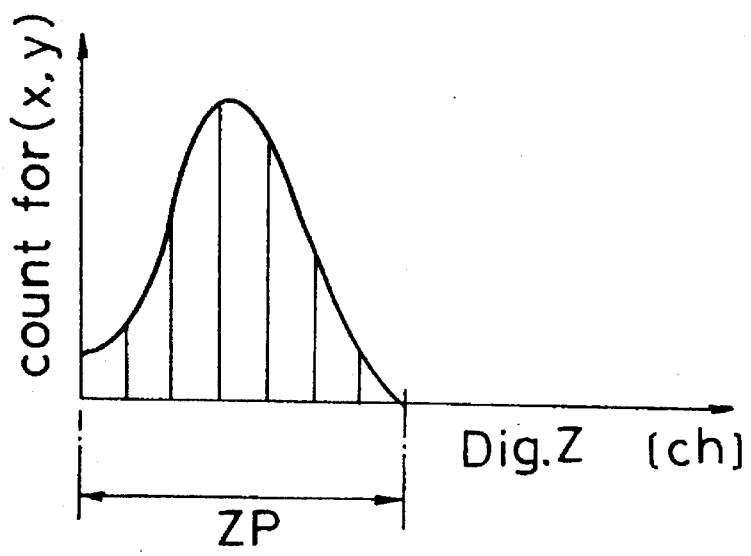

By using the value Dig.Z' as addresses, the image collection memory 11 collects data of respective pixels, in channel widths as shown in FIG. 8B. Offset α and gain β may have variable values to provide variable channel widths. Such a circuit 20 is one example of channel width converting means of this invention.

Figure 10A:
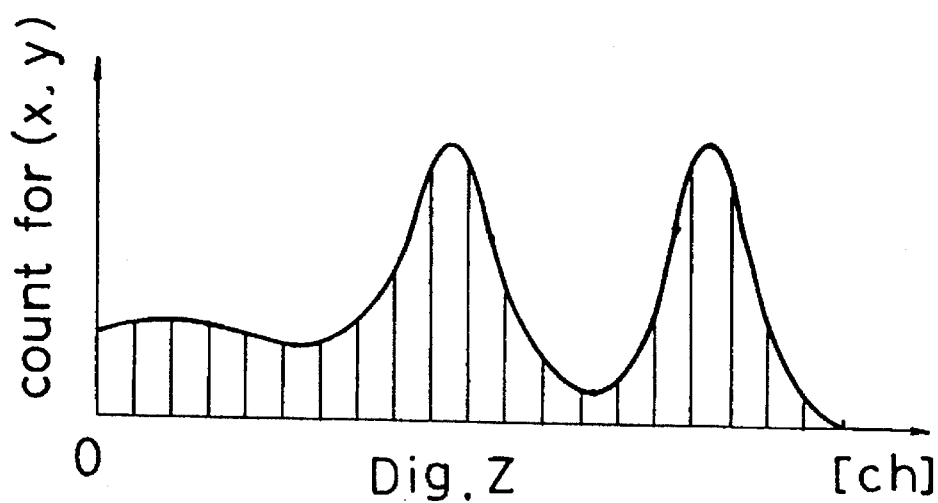
FIGS. 10A and 10B are views showing an energy spectrum having two photoelectric peaks.
Figure 10B:
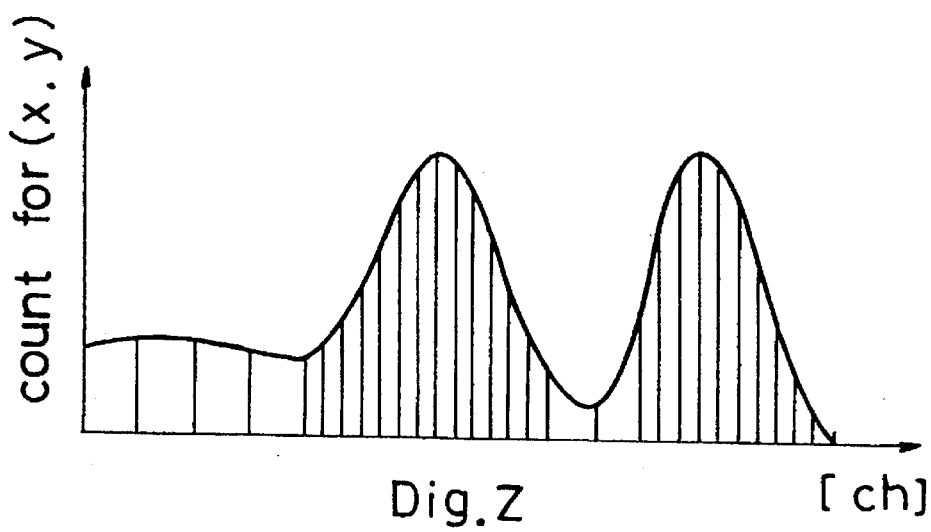

Where, for example, two or more types of radioactive substances, or radioactive substances such as $^{67}G$ $^{111}I$ or the like are introduced into the body, two or more photoelectric peaks will appear in each energy spectrum collected, as shown in FIG. 10A. In the case of such an energy spectrum, there is a desire for data collection in small channel widths adjacent each peak, and in large channel widths for the remaining regions as shown in FIG. 10B. To cope with such a situation, the foregoing embodiment may include a table for nonlinearly converting the channel widths of the energy signal in which the image collection memory 11 collects image data.

Figure 11:
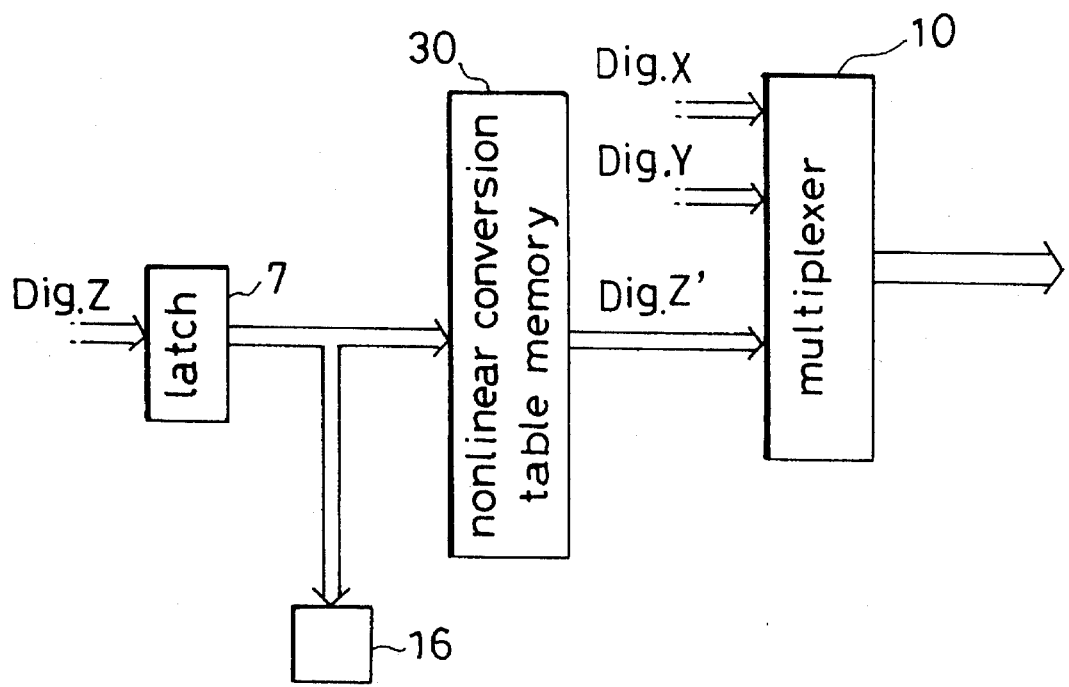
FIG. 11 is a block diagram of a different channel width converter.
Figure 12:
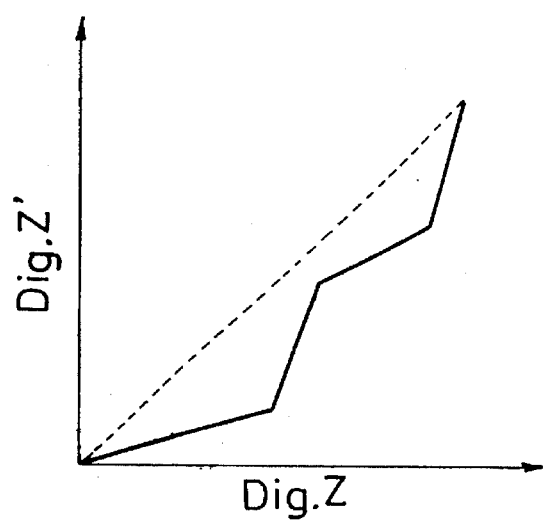
FIG. 12 is an explanatory view of data stored in a nonlinear conversion table memory.

Specifically, as shown in FIG. 11, a nonlinear conversion table memory 30 is interposed between the latch circuit 7 and multiplexer 10. This nonlinear conversion table memory 30 stores a table for converting input data Dig.Z to output values Dig. Z'. The solid line in FIG. 12 represents relations for providing channel widths as shown in FIG. 10B. The dotted line represents output of uniform channel widths as shown in FIG. 10A. The values Dig.Z' converted through the table memory 30 are used as addresses, whereby data is collected in the channel widths as shown in FIG. 10B. The contents of the table may have variable values to provide variable channel widths. Such a nonlinear conversion table memory 30 is another example of channel width converting means of this invention.

Second Embodiment

A scatter correcting device 100 forming a principal portion of a second embodiment will be described next with reference to FIG. 13. The apparatus in the second embodiment corresponds to the invention defined in claim 2. Like reference numerals are used to identify like parts in FIGS. 1 and 2, which are the same as in the first embodiment and will not particularly be described again.

Figure 13:
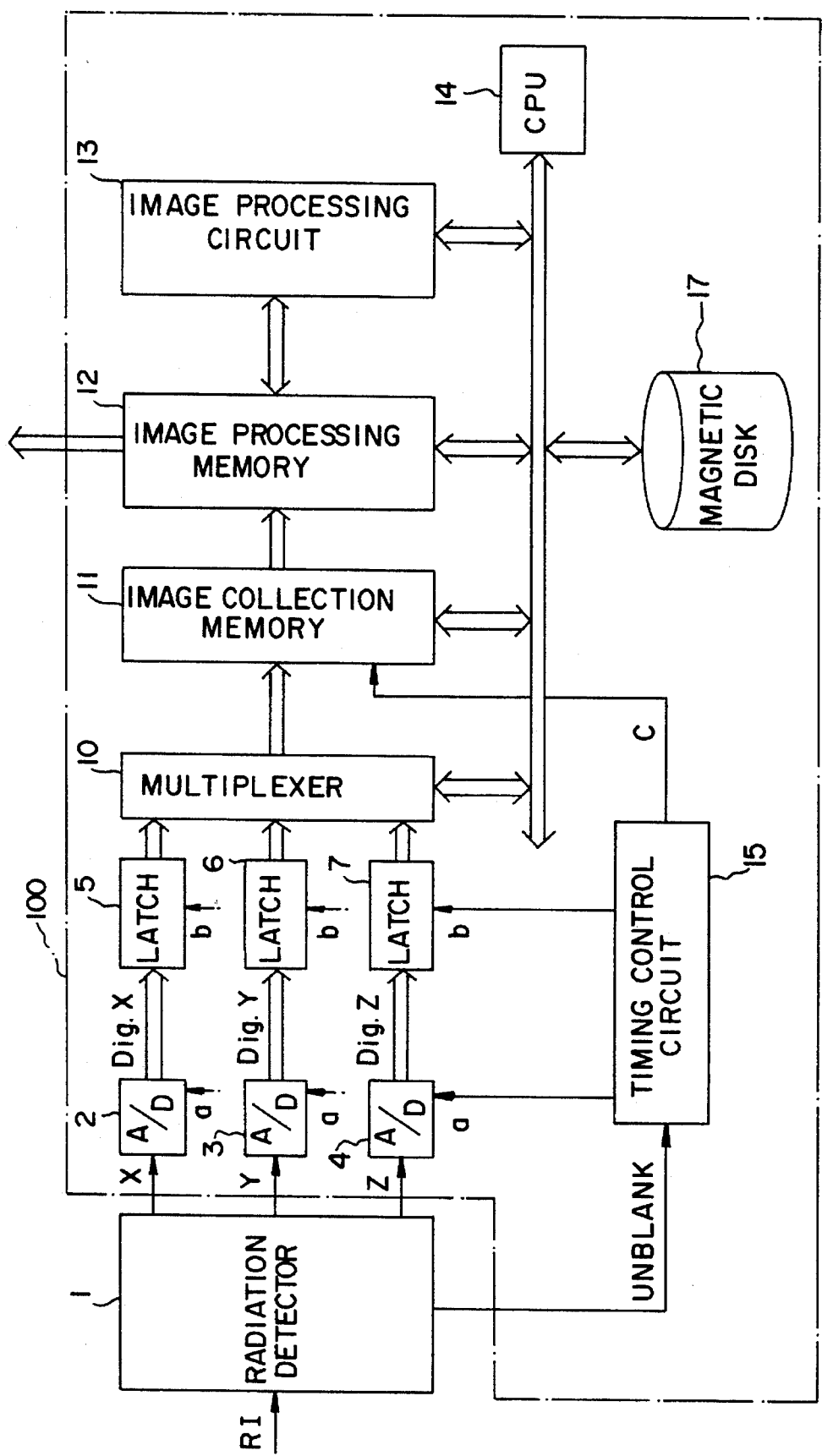
FIG. 13 is a block diagram of a scatter correcting device in a second embodiment of this invention.

In the second embodiment, as shown in FIG. 13, the two-dimensional position signals X and Y and energy signal Z outputted from the radiation detector 1 are converted to digital signals Dig.X, Dig.Y and Dig.Z by A/D converters 2, 3 and 4, and transmitted through latch circuits 5, 6 and 7 to a multiplexer 10, respectively. The multiplexer 10 switches and selects the signals Dig.X, Dig.Y and Dig.Z as address signals, and transmits them to an image collection memory 11 corresponding to the image data collecting and storing means.

The preliminary pulse amplitude analyzer included in the radiation detector 1 transmits the unblank signal to a timing control circuit 15 to trigger the latter. With each triggering (i.e. each event of radiation incidence), the timing control circuit 15 generates appropriate timing signals "a", "b" and "c", and transmits these signals to the A/D converters 2, 3 and 4, latch circuits 5, 6 and 7 and image collection memory 11.

Figure 14:
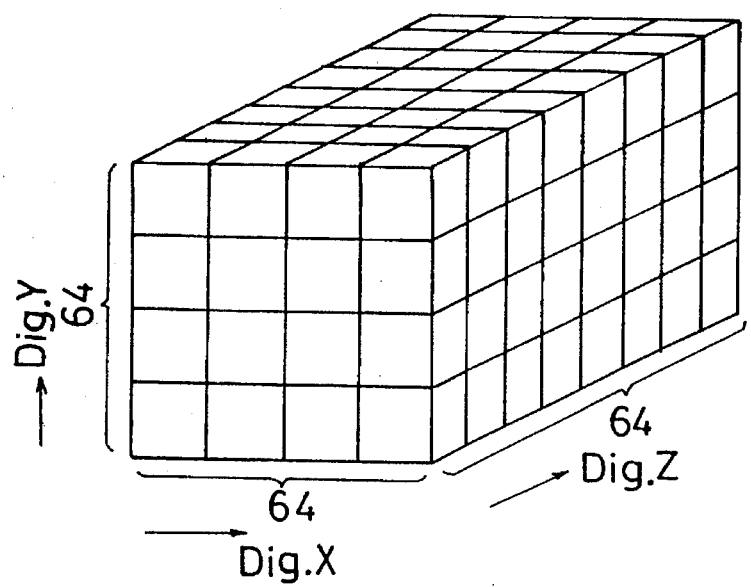
FIG. 14 is a conceptual view of an image collection memory.

For each event generating the unblank signal, the image collection memory 11 adds +1 to a current two-dimensional address designated by the signals Dig.X and Dig.Y or three-dimensional address designated by the signals Dig.X, Dig.Y and Dig.Z from the multiplexer 8. Thus, the image collection memory 11 collects three-dimensional image data in the form of a 64×64×64 matrix as shown in FIG. 14, for example. FIG. 14 shows a case of collecting three-dimensional image data.

The matrix size for the three-dimensional image data collected is selected beforehand by a switching operation of the multiplexer 10.

As a result, the image collection memory 11 collects energy spectra for individual pixels as shown in FIGS. 5A and 5B.

The data collected in the memory 11 are transferred to an image processing memory 12. The image processing memory 12 and an image processing circuit 13 effect various image processing such as filter processing and a scatter correction with energy weighted acquisition described later. Energy weight functions used in the scatter correction with the energy weighted acquisition are stored in a magnetic disk 17 in advance, which are loaded into the memory 12 for computation. The multiplexer 10, image collection memory 11, image processing memory 12, image processing circuit 13 and magnetic disk 17 are controlled by a CPU 14. The image processing memory 12 and image processing circuit 13 correspond to the filter means and data correcting means in claim 2.

The three-dimensional image data collected in the image collection memory 11 are transferred to the image processing memory 12. The image processing memory 12 and image processing circuit 13 first carry out smoothing processing (two-dimensional space low-pass filter processing) for the image data, as expressed by the following equation:

$$C_{sm}i(x, y) = Ci(x, y) \otimes S(x, y) \quad (7)$$
$$(i = 1 \text{ to max})$$

where $Ci(x, y)$ is a count of energy Dig.Z=i[ch] for pixel (x, y), $C_{sm}i(x, y)$ is a count of energy Dig.Z=i[ch] for pixel (x, y) after the smoothing processing, $S(x, y)$ is a two-dimensional smoothing function in X and Y directions (e.g. nine-point smoothing being carried out for 3×3 pixels), and $\otimes$ represents a convolutional operation.

The two-dimensional space low-pass filter processing is not limited to the above smoothing processing. For example, a two-dimensional space low-pass filter such as a Butterworth type filter may be used to filter the count of energy Dig.Z=i[ch] for each pixel.

Next, the scatter correction with the energy weighted acquisition is carried out for each unit of 64×64 pixels in X and Y directions, as expressed by the following equation:

$$Cc(x, y) = \sum_{i=1}^{max} [Ki(r) \cdot \{p(k) \cdot Ci(x, y) + q(k) \cdot C_{sm}i(x, y)\}] \quad (8)$$

where $Cc(x, y)$ is a count for pixel (x, y) after the correction, $Ki(r)$ is a weight function relating to energy Dig.Z for parameter "r" (e.g. a count ratio between photoelectric peak region and Compton scatter region) derived from energy spectral information of each pixel (x, y), $p(k)$ is 1 (when $Ki(r) \geq 0$) or 0 (when $ki(r) < 0$), and $q(k)$ is 0 (when $Ki(r) \geq 0$) or 1 (when $ki(r) < 0$).

Weight function $Ki(r)$ is derived beforehand from a phantom or the like, and stored in the magnetic disk 17. Then, parameter "r" is derived from actual energy spectral information of each pixel, and is substituted to obtain a weight. This computation is carried out by the image processing circuit 13 and CPU 14. Weight functions thus obtained are similar to those shown in FIGS. 6A and 6B.

As in the above equation, the value of weight function $Ki(r)$ is compared with predetermined value "0". For an energy range where the value is "0" or above, the weight function is applied to the data before the filter processing. For an energy range where the value is below "0", the weight function is applied to the data after the filter processing. In this way, the scatter correction with the energy weighted acquisition is carried out for each pixel (x, y). That is, in an energy range having weight function $ki(r)$ below "0", i.e. in a region of scattered radiation, the data has a small count and a large error, and therefore the data after the filter processing is used to diminish the error. A region of scattered radiation essentially has data of low spatial resolution, and no harm is done by use of filtered data. In an energy range having weight function $ki(r)$ of "0" or above, the data has a large count and is considered to include only a small proportion of scattered radiation. Thus, the scatter correction with the energy weighted acquisition is carried out for this energy range, using the data before the filter processing.

It is thus possible to prevent an increase in computational errors due to statistical errors in cold spots and the like having small counts. This is effective to avoid noise-ridden images of cold spots and the like.

A count $C_0(x, y)$ of 20% windows to be excluded from the scatter correction may be derived for each pixel from the data collected in the image collection memory 11, using equation (2) described in the first embodiment.

The above embodiment is not limitative but may be modified in various ways without departing from the purport of claim 2. For example, matrix sizes other than that described above may be employed.

The above embodiment may be modified such that the above energy weight function $ki(r)$ is not dependent on the spectrum of each pixel.

The above embodiment uses "0" as the predetermined value for comparison with the energy weight function $ki(r)$, but a value other than "0" may be used instead.

In the above embodiment, the energy range is divided into two parts by using the predetermined value, and the weight function is applied to the data before the filter processing for the energy range having a value equal to or above the predetermined value, and to the data after the filter processing for the energy range having a value below the predetermined value. The energy range below the predetermined value (i.e. the energy range for which the weight function is applied to the data after the filter processing) may be further divided into two or more parts by using a threshold value or values below the predetermined value. Then, for each divided energy range, weight functions may be applied to the data after different filter processing. For example, the predetermined value may be set to "0" and the threshold value to "−0.1". Then, the energy range is divided into three parts, i.e. an energy range of "0" and above, an energy range of "−0.1" and above but below "0", and an energy range below "−0.1". For the energy range of "0" and above, the weight function is applied to the data before the filter processing as described in the above embodiment. For the energy range of "−0.1" and above but below "0", the weight function is applied to the data subjected to the 3×3 smoothing processing once, for example. For the energy range below "−0.1", the weight function is applied to the data subjected to the 3×3 smoothing processing twice, for example. This eliminates the influences of noise in a most effective way.

In this embodiment also, as in the first embodiment, a circuit 20 as shown in FIG. 9 or a nonlinear conversion table memory 30 as shown in FIG. 11 may be interposed between the latch circuit 7 and multiplexer 10.

Third Embodiment

Figure 15:
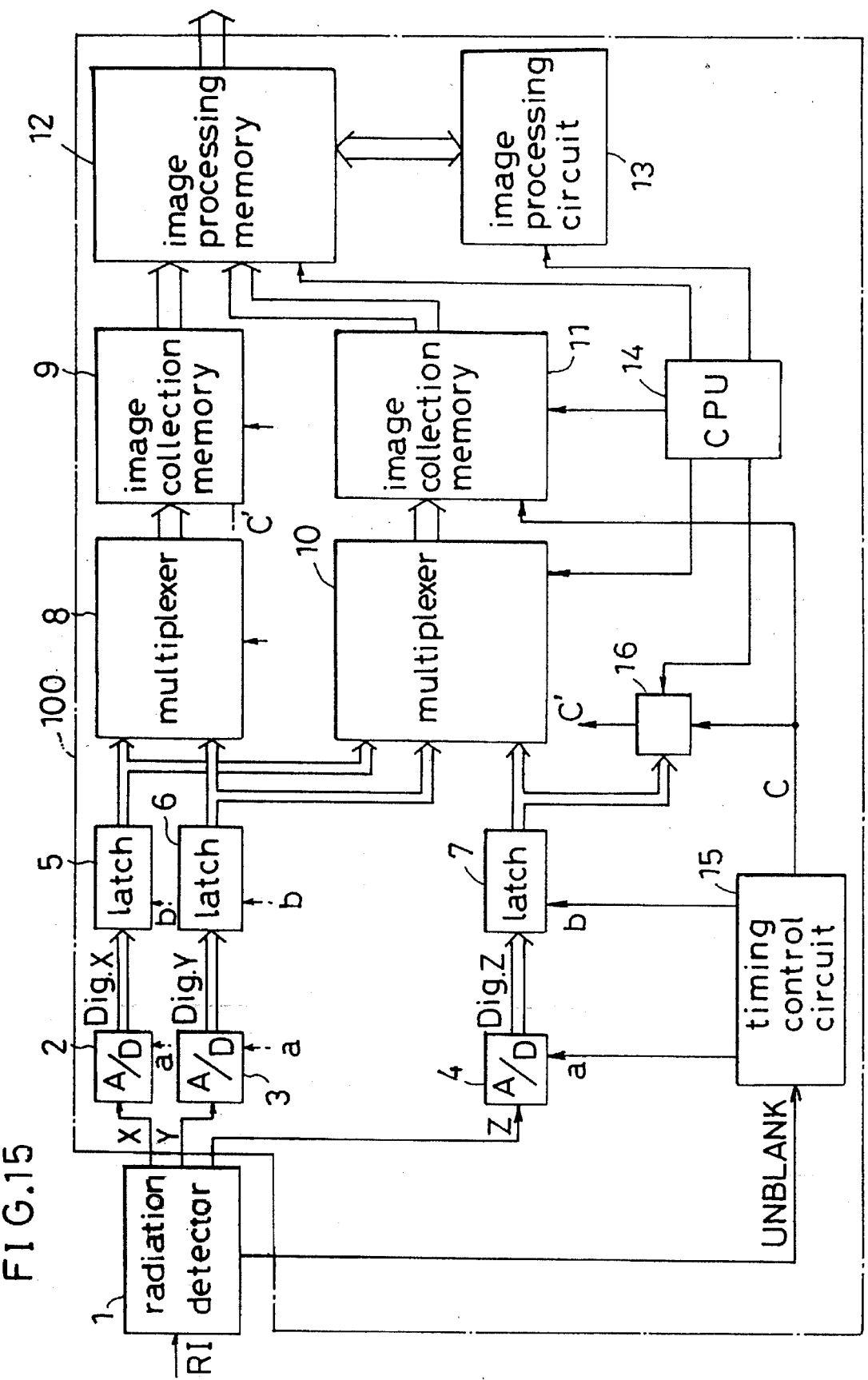
FIG. 15 is a block diagram of a scatter correcting device in a third embodiment of this invention.

A third embodiment of this invention will be described next with reference to FIG. 15. The third embodiment basically has the same construction as the first embodiment (FIGS. 1 and 2). In the third embodiment, the after-processing such as the scatter correction carried out by the image processing circuit 13 is a combination of the after-processing in the first embodiment and the after-processing in the second embodiment.

The particulars of the processing carried out by the image processing circuit 13 for the data stored in the image processing memory 12 will be described hereunder.

As described in the first embodiment, the image processing memory 12 stores the data collected by the image collection memories 9 and 11, i.e. two-dimensional image data within the predetermined energy window and in a fine matrix, and three-dimensional image data in a coarse matrix and including spectral information.

The image processing circuit 13 first carries out two-dimensional space low-pass filter processing, e.g. the smoothing processing (equation (7)) described in the second embodiment, for the three-dimensional image data in the coarse matrix and including the spectral information.

Next, the scatter correction with the energy weighted acquisition is carried out for the three-dimensional image data in the coarse matrix and including the spectral information, by equation (8) in the second embodiment, using energy weighting functions obtained beforehand from a phantom or the like and stored in the image processing circuit 13. That is, for an energy range where the value of the weight function is equal to or above a predetermined value, the weight function is applied to the data before the filter processing. For an energy range where the value is below the predetermined value, the weight function is applied to the data after the filter processing. In this way, the scatter correction is carried out for the three-dimensional image data in the coarse matrix and including the spectral information.

Then, equation (2) is used to obtain, for each pixel, count $C_0(x, y)$ of 20% windows excluded from the scatter correction.

Subsequently, as in the first embodiment, equation (3) is used to derive correction coefficient $p(x, y)$ from the ratio between count $C_0$ after the correction and count $C_0$ of 20% windows excluded from the correction. The correction coefficient derived is interpolated (e.g. using equation (4)) to determine a correction coefficient for each pixel in the fine matrix collected by the image collection memory 9. Then, the scatter correction of image data is effected for each pixel in the fine matrix collected by the image collection memory 9 by multiplying the image data of each pixel by the correction coefficient as shown in equation (5).

With the above construction, this embodiment realizes, besides the effects of the first embodiment, i.e. diminishing amounts of computation and statistical errors, the effects of the second embodiment, i.e. suppressing noise in background regions and cold spots in the case of small counts as in clinical data, to diminish influences of scattered radiation, increase contrast of the cold spots, and enhance spatial resolution of images.

The image processing memory 12 and image processing circuit 13 in this embodiment correspond to the filter means and image processing means in claim 3.

In this embodiment also, as in the first embodiment, a circuit 20 as shown in FIG. 9 or a nonlinear conversion table memory 30 as shown in FIG. 11 may be interposed between the latch circuit 7 and multiplexer 10.

Further, in this embodiment, as in the second embodiment, the energy range below the predetermined value may be further divided into two or more parts by using a threshold value or values below the predetermined value. Then, for each divided energy range, weight functions may be applied to the data after different filter processing.

The present invention may be embodied in other specific forms without departing from the spirit or essential attributes thereof and, accordingly, reference should be made to the appended claims, rather than to the foregoing specification, as indicating the scope of the invention.

What is claimed is:

1. A nuclear medicine imaging apparatus having a scatter correcting device for processing radiation detected after being released by radioactive substances introduced into a body examined, said apparatus comprising:

radiation detecting means for generating two-dimensional position signals indicating positions of incident radiation, and an energy signal indicating energy level of said radiation;

image data collecting and storing means for collecting three-dimensional image data at addresses provided by digital values of said two-dimensional position signals and said energy signal;

filter means for effecting two-dimensional low-pass filter processing for said three-dimensional image data collected; and data correcting means for effecting a scatter correction with energy weighted acquisition for each pixel by using an energy weighting function stored in advance, such that, for an energy range having a value of said function over or equal to a predetermined value, said function is applied to data not processed by said filter means, and for an energy range having a value of said function below said predetermined value, said function is applied to data processed with said filter by said filter means, wherein said two-dimensional space low-pass filter processing effected by said filter means is smoothing processing.

2. A nuclear medicine imaging apparatus having a scatter correcting device for processing radiation detected after being released by radioactive substances introduced into a body examined, said apparatus comprising:

radiation detecting means for generating two-dimensional position signals indicating positions of incident radiation, and an energy signal indicating energy level of said radiation;

image data collecting and storing means for collecting three-dimensional image data at addresses provided by digital values of said two-dimensional position signals and said energy signal;

filter means for effecting two-dimensional low-pass filter processing for said three-dimensional image data collected; and data correcting means for effecting a scatter correction with energy weighted acquisition for each pixel by using an energy weighting function prepared and stored in advance, and comparing said function and a predetermined value with respect to each energy channel in each pixel, such that, for an energy range having a value of said function over or equal to a predetermined value, said function is applied to data not processed by said filter means, and for an energy range having a value of said function below said predetermined value, said function is applied to data processed with said filter by said filter means.

3. A nuclear medicine imaging apparatus having a scatter correcting device for processing radiation detected after being released by radioactive substances introduced into a body examined, said apparatus comprising:

radiation detecting means for generating two-dimensional position signals indicating positions of incident radiation, and an energy signal indicating energy level of said radiation;

image data collecting and storing means for collecting three-dimensional image data at addresses provided by digital values of said two-dimensional position signals and said energy signal;

filter means for effecting two-dimensional low-pass filter processing for said three-dimensional image data collected; and data correcting means for effecting a scatter correction with energy weighted acquisition for each pixel by using an energy weighting function stored in advance, such that, for an energy range having a value of said function over or equal to a predetermined value, said function is applied to data not processed by said filter means, and for an energy range having a value of said function below said predetermined value, said function is applied to data processed with said filter by said filter means, wherein said filter means is operable to effect plural types of two-dimensional space low-pass filter processing for said two-dimensional image data collected in said image data collecting and storing means, and said data correcting means is operable to divide said energy range having a value of said function below said predetermined value into at least two energy ranges by using a threshold value below said predetermined value, said energy weighting function being applied for each of said two energy ranges divided by said threshold value, after different two-dimensional space low-pass filter processing.

4. A nuclear medicine imaging apparatus having a scatter correcting device for processing radiation detected after being released by radioactive substances introduced into a body examined, said apparatus comprising:

radiation detecting means for generating two-dimensional position signals indicating positions of incident radiation, and an energy signal indicating energy level of said radiation;

image data collecting and storing means for collecting three-dimensional image data at addresses provided by digital values of said two-dimensional position signals and said energy signal;

filter means for effecting two-dimensional low-pass filter processing for said three-dimensional image data collected; and data correcting means for effecting a scatter correction with energy weighted acquisition for each pixel by using an energy weighting function stored in advance, such that, for an energy range having a value of said function over or equal to a predetermined value, said function is applied to data not processed by said filter means, and for an energy range having a value of said function below said predetermined value, said function is applied to data processed with said filter by said filter means, said apparatus further comprising channel width converting means for converting channel widths of said energy signal providing the addresses for the image data collected in said image data collecting and storing means.

5. A nuclear medicine imaging apparatus as defined in claim 4, wherein said channel width converting means includes a conversion table memory for storing relations between channel widths before conversion and channel widths after the conversion.

6. A nuclear medicine imaging apparatus as defined in claim 4, wherein said channel width converting means includes subtracting means for subtracting a predetermined offset value from said energy signal, and multiplying means for multiplying a value outputted from said subtracting means by a predetermined gain.

7. A nuclear medicine imaging apparatus having a scatter correcting device for processing radiation detected after being released by radioactive substances introduced into a body examined, said apparatus comprising:

radiation detecting means for generating two-dimensional position signals indicating positions of incident radiation, and an energy signal indicating energy level of said radiation;

first image data collecting and storing means for collecting two-dimensional image data at addresses provided by digital values of said two-dimensional position signals, respectively;

second image data collecting and storing means for collecting three-dimensional image data at addresses provided by upper bits of said digital values of said two-dimensional position signals and by digital values of said energy signal;

pulse amplitude analyzing means for analyzing said energy signal to allow said first image data collecting and storing means to carry out data correction when said energy signal has a pulse height falling within a predetermined window; and image processing means for effecting a scatter correction with energy weighted acquisition for the data collected in said second image data collecting and storing means, obtaining a first correction coefficient for each pixel in said second image data collecting and storing means by computing, for each pixel, a ratio between data resulting from the correction and data within said window of the data collected in said second image data collecting and storing means prior to the correction, obtaining a second correction coefficient for each pixel in said first image data collecting and storing means by interpolating said first correction coefficient, and applying said second correction coefficient to the data collected in said first image data collecting and storing means, thereby to correct said image data collected in said first image data collecting and storing means.

8. A nuclear medicine imaging apparatus as defined in claim 7, further comprising channel width converting means for converting channel widths of said energy signal providing the addresses for the image data collected in said second image data collecting and storing means.

9. A nuclear medicine imaging apparatus as defined in claim 8, wherein said channel width converting means includes a conversion table memory for storing relations between channel widths before conversion and channel widths after the conversion.

10. A nuclear medicine imaging apparatus as defined in claim 8, wherein said channel width converting means includes subtracting means for subtracting a predetermined offset value from said energy signal, and multiplying means for multiplying a value outputted from said subtracting means by a predetermined gain.

11. A nuclear medicine imaging apparatus as defined in claim 7, further comprising filter means for effecting two-dimensional low-pass filter processing for said three-dimensional image data collected in said second image data collecting and storing means, wherein said image processing means is operable to effect said scatter correction with energy weighted acquisition for each data collected in said second image data collecting and storing means, by using an energy weighting function stored in advance, such that, for an energy range having a value of said function over or equal to a predetermined value, said function is applied to data not processed by said filter means, and for an energy range having a value of said function below said predetermined value, said function is applied to data processed with said filter by said filter means.

12. A nuclear medicine imaging apparatus as defined in claim 11, wherein said two-dimensional space low-pass filter processing effected by said filter means is smoothing processing.

13. A nuclear medicine imaging apparatus as defined in claim 11, wherein said filter means is operable to effect plural types of two-dimensional space low-pass filter processing for said two-dimensional image data collected in said second image data collecting and storing means, and said image processing means is operable to divide said energy range having a value of said function below said predetermined value into at least two energy ranges by using a threshold value below said predetermined value, said energy weighting function being applied for each of said two energy ranges divided by said threshold value, after different two-dimensional space low-pass filter processing.

14. A nuclear medicine imaging apparatus as defined in claim 11, further comprising channel width converting means for converting channel widths of said energy signal providing the addresses for the image data collected in said second image data collecting and storing means.

15. A nuclear medicine imaging apparatus as defined in claim 14, wherein said channel width converting means includes a conversion table memory for storing relations between channel widths before conversion and channel widths after the conversion.

16. A nuclear medicine imaging apparatus as defined in claim 14, wherein said channel width converting means includes subtracting means for subtracting a predetermined offset value from said energy signal, and multiplying means for multiplying a value outputted from said subtracting means by a predetermined gain.

* * * * *